United States Patent
Ohta et al.

(10) Patent No.: US 8,600,219 B2
(45) Date of Patent: Dec. 3, 2013

(54) VIDEO-SIGNAL RECORDING AND PLAYBACK APPARATUS, VIDEO-SIGNAL RECORDING AND PLAYBACK METHOD, AND RECORDING MEDIUM

(75) Inventors: Masashi Ohta, Shinagawa-ku (JP); Koichi Chotoku, Shinagawa-ku (JP); Taro Suito, Kanagawa (JP); Toshimichi Hamada, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 1644 days.

(21) Appl. No.: 11/614,902

(22) Filed: Dec. 21, 2006

(65) Prior Publication Data

US 2007/0104459 A1    May 10, 2007

Related U.S. Application Data

(63) Continuation of application No. 09/903,158, filed on Jul. 11, 2001, now Pat. No. 7,164,846.

(30) Foreign Application Priority Data

Jul. 13, 2000    (JP) ................................. 2000-212295

(51) Int. Cl.
*H04N 5/761*    (2006.01)
(52) U.S. Cl.
USPC ........................................ 386/278; 386/286
(58) Field of Classification Search
None
See application file for complete search history.

(56) References Cited

U.S. PATENT DOCUMENTS

| | | | | |
|---|---|---|---|---|
| 5,546,191 A | * | 8/1996 | Hibi et al. | 386/291 |
| 5,732,146 A | * | 3/1998 | Yamada et al. | 382/107 |
| 5,959,697 A | * | 9/1999 | Coleman, Jr. | 348/700 |
| 5,974,218 A | * | 10/1999 | Nagasaka et al. | 386/200 |
| 6,571,054 B1 | * | 5/2003 | Tonomura et al. | 386/241 |
| 6,618,491 B1 | | 9/2003 | Abe | |
| 6,728,473 B1 | | 4/2004 | Chotoku et al. | |
| 6,870,573 B2 | * | 3/2005 | Yeo et al. | 348/569 |
| 7,164,846 B2 | * | 1/2007 | Ohta et al. | 386/253 |

FOREIGN PATENT DOCUMENTS

| | | |
|---|---|---|
| JP | 8-9314 | 1/1996 |
| JP | 8-331504 | 12/1996 |
| JP | 9-312827 | 12/1997 |
| JP | 10-116344 | 5/1998 |
| JP | 11-88798 | 3/1999 |
| JP | 11-284948 | 10/1999 |
| JP | 2000-175133 | 6/2000 |

* cited by examiner

*Primary Examiner* — Huy T Nguyen
*Assistant Examiner* — Eileen Adams
(74) *Attorney, Agent, or Firm* — Oblon, Spivak, McClelland, Maier & Neustadt, L.L.P.

(57) ABSTRACT

Disclosed is a video-signal recording and playback apparatus for recording or playing back a video signal, the video-signal recording and playback apparatus comprising: extracting means for extracting a static picture from a sequence of video signals with a predetermined timing; judgment means for forming a judgment as to whether or not a static picture extracted by the extracting means can be used as a representative picture; and setting means for setting the static picture as a representative picture in accordance with an outcome of a judgment formed by the judgment means.

14 Claims, 7 Drawing Sheets

VIDEO-SIGNAL RECORDING AND PLAYBACK APPARATUS, VIDEO-SIGNAL RECORDING AND PLAYBACK METHOD, AND RECORDING MEDIUM

CROSS-REFERENCE TO RELATED APPLICATIONS

The present application is a continuation of application Ser. No. 09/903,158, filed on Jul. 11, 2001, which claims priority to Japanese Patent Application No. JP 2000-212295, filed Jul. 13, 2000, the contents of each of which are incorporated herein by reference.

BACKGROUND OF THE INVENTION

In general, the present invention relates to a video-signal recording and playback apparatus, a video-signal recording and playback method and a recording medium. More particularly, the present invention relates to a video-signal recording and playback apparatus, a video-signal recording and playback method and a recording medium suitable for a case in which a recommended position to start an operation to playback a video signal from a recording medium is provided.

In order to allow the user to grasp the contents of a program recorded on a recording medium or the contents of a group of such programs, or in order to search such a recording medium for a program, there is provided a method whereby a plurality of shrunk static pictures or moving pictures each representing a program or a scene is displayed on a screen and the user is allowed to specify one of the displayed pictures in order to select a desired program or a desired scene of a program. A shrunk static picture is referred to as a thumb nail.

With the conventional method, a picture appearing right after the start of a recording operation is captured or pictures are captured at fixed intervals to be used as a representative picture of a program or a scene.

By the way, there are raised problems described below in the method cited above whereby, in the conventional signal recording and playback apparatus, pictures are browsed at fixed intervals to be used as representatives of programs or scenes.

For example, a picture taken as a representative picture of a program is not a scene of a program. Instead, a picture taken as a representative picture of a program is a picture in a CM (commercial) or a picture of a blue sky. Such a representative picture of a program cannot be used to infer the contents of the program at all. In such a case, it is generally difficult for the user to select a desired program or a desired scene in a program.

SUMMARY OF THE INVENTION

It is thus an object of the present invention addressing the problems described above to provide a capability of extracting a program's representative picture allowing the user to select a desired one among programs or a desired one among a program's scenes.

In carrying out the invention and according to one aspect thereof, there is provided a video-signal recording and playback apparatus for recording or playing back a video signal, the video-signal recording and playback apparatus comprising: extracting means for extracting a static picture from a sequence of video signals with a predetermined timing; judgment means for forming a judgment as to whether or not a static picture extracted by the extracting means can be used as a representative picture; and setting means for setting the static picture as a representative picture in accordance with an outcome of a judgment formed by the judgment means.

According to a second aspect of the invention, there is provided a video-signal recording and playback method adopted in a video-signal recording and playback apparatus for recording or playing back a video signal, the video-signal recording and playback method comprising: an extracting step of extracting a static picture from a sequence of video signals with a predetermined timing; a judgment step of forming a judgment as to whether or not the static picture extracted at the extracting step can be used as a representative picture; and a setting step of setting the static picture as a representative picture in accordance with an outcome of a judgment formed at the judgment step.

According to a third aspect of the invention, there is provided a recording medium for recording a program for controlling a video-signal recording and playback apparatus for recording or playing back a video signal, wherein the program is a computer readable program, the program comprising: an extracting step of extracting a static picture from a sequence of video signals with a predetermined timing; a judgment step of forming a judgment as to whether or not the static picture extracted at the extracting step can be used as a representative picture; and a setting step of setting the static picture as a representative picture in accordance with an outcome of a judgment formed at the judgment step.

With this configuration, in accordance with the present invention's video-signal recording and playback apparatus and video-signal recording and playback method and a program recorded in the recording medium provided by the present invention, a static picture is extracted from a sequence of video signals with a predetermined timing; a judgment as to whether or not a static picture extracted at the extracting step can be used as a representative picture is formed; and the static picture is set on a representative picture in accordance with an outcome of the judgment. As a result, it is possible to extract a program's representative picture allowing a desired program or a desired scene to be selected.

The above and other objects, features and advantages of the present invention will become apparent from the following description and the appended claims, taken in conjunction with the accompanying drawings in which like parts or elements denoted by like reference symbols.

PREFERRED EMBODIMENT OF THE INVENTION

A hard-disc recorder implemented by a preferred embodiment of the present invention is explained by referring to diagrams as follows.

Figure 1:
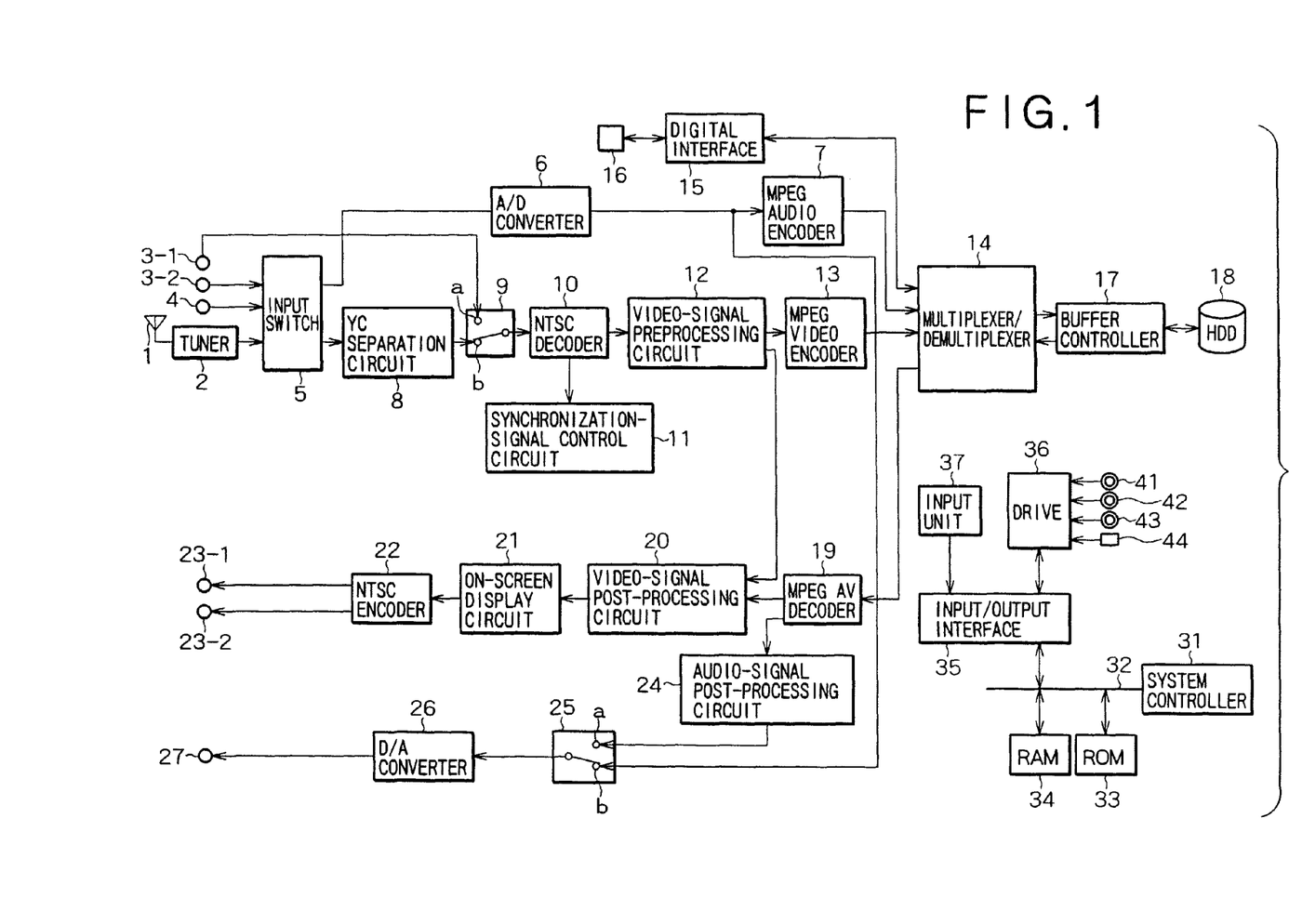
FIG. 1 is a block diagram showing a typical configuration of a hard-disc recorder implemented by an embodiment of the present invention.

FIG. 1 is a block diagram showing a typical configuration of a hard-disc recorder. An antenna 1 receives a television broadcast and supplies a signal of the broadcast to a tuner 2. In accordance with a command issued by a system controller 31, the tuner 2 extracts a signal of a program of a predetermined channel from the television broadcast's signal received from the antenna 1. The extracted signal is supplied to an input switch 5.

An external apparatus not shown in the figure supplies an S video signal to a terminal a of a switch 9 by way of an external video input terminal 3-1. An S video signal is separated signals comprising a Y signal (luminance signal) and a C signal (chrominance signal). An external apparatus not shown in the figure supplies a composite video signal to the input switch 5 by way of an external video input terminal 3-2. An external apparatus not shown in the figure supplies an audio signal to the input switch 5 by way of an external video input terminal 4.

In accordance with a command issued by the system controller 31, the input switch 5 selects a desired signal from the video signal and the audio signal, which are supplied thereto. If the selected signal is the composite video signal, the input switch 5 supplies the selected composite video signal to a YC circuit 8. If the selected signal is the audio signal, on the other hand, the input switch 5 supplies the selected audio signal to an A/D (Analog to Digital) converter 6.

The A/D converter 6 converts an audio signal received from the input switch 5 into digital data by A/D conversion and supplies the digital data to an MPEG (Moving Picture Experts Group) audio encoder 7. The A/D converter 6 also supplies the digital audio data obtained as a result of the A/D conversion to a terminal b of the input switch 25. In accordance with a command issued by the system controller 31, the MPEG audio encoder 7 carries out a compression process adopting an MPEG technique on the digital audio data received from the A/D converter 6 to generate an audio ES (elementary stream). The MPEG audio encoder 7 supplies the audio ES to a multiplexer/demultiplexer 14.

In accordance with a command issued by the system controller 31, a YC separation circuit 8 separates a composite video signal received from the input switch 5 into a luminance signal (or a Y signal) and a chrominance signal (or a C signal). The YC separation circuit 8 supplies the Y signal and the C signal to an NTSC (National Television System Committee) decoder 10 by way of a terminal b of the switch 9. In accordance with a command issued by the system controller 31, the switch 9 changes its contact to a terminal a to forward an S signal received from an external apparatus to the NTSC decoder 10. Also in accordance with a command issued by the system controller 31, the switch 9 changes its contact to a terminal b to forward Y and C signals received from the YC separation circuit 8 to the NTSC decoder 10.

In accordance with a command issued by the system controller 31, the NTSC decoder 10 carries out processes such as A/D conversion and chroma encode processing on a video signal received from the switch 9 to convert the video signal into a digital component video signal referred to hereafter as picture data. The NTSC decoder 10 supplies the picture data to a video-signal preprocessing circuit 12. The NTSC decoder 10 also generates a clock signal based on a horizontal synchronization signal of a received video signal. In addition, the NTSC decoder 10 supplies a field-identifying signal, a vertical synchronization signal and the horizontal synchronization signal obtained as a result of synchronous separation to a synchronization-signal control circuit 11.

In accordance with a command issued by the system controller 31, the synchronization-signal control circuit 11 generates clock and synchronization signals with the field-identifying signal, the vertical synchronization signal and the horizontal synchronization from the NTSC decoder 10 used as a reference. The synchronization-signal control circuit 11 supplies the generated clock and synchronization signals to a variety of components.

In accordance with a command issued by the system controller 31, the video-signal preprocessing circuit 12 carries out video signal processing such as pre-filtering on picture data received from the NTSC decoder 10 to generate a representative picture. The video-signal preprocessing circuit 12 supplies the representative picture to an MPEG video encoder 13 and a video-signal post-processing circuit 20. In accordance with a command issued by the system controller 31, the MPEG video encoder 13 carries out an encoding process such as DCT (Discrete Cosine Transform) processing on picture data received from the video-signal preprocessing circuit 12 to generate an elementary stream of the picture. The MPEG video encoder 13 supplies the elementary stream to the multiplexer/demultiplexer 14.

In accordance with a command issued by the system controller 31, in a recording operation, the multiplexer/demultiplexer 14 multiplexes an elementary stream of a picture and an audio elementary stream, which has completed compression adopting the MPEG technique, as well as a variety of control signals to generate typically an MPEG TS (transport stream). The video-signal preprocessing circuit 12 supplies the MPEG TS to a buffer controller 17. In a playback operation, on the other hand, the multiplexer/demultiplexer 14 demultiplexes an MPEG TS received from the buffer controller 17 to extract a PES (Packetized Elementary Stream) from the MPEG TS. The multiplexer/demultiplexer 14 supplies the extracted PES to an MPEG AV decoder 19.

In accordance with a command issued by the system controller 31, the buffer controller 17 executes control to intermittently supply the transport stream received continuously from the multiplexer/demultiplexer 14 to an HDD (Hard-Disc Drive) 18. While the HDD 18 is carrying out a seek operation, for example, a transport stream cannot be written into a hard disc of the HDD 18. In this case, the transport stream is stored temporarily in a buffer. As the seek operation is completed, allowing a transport stream to be written into the hard disc, the stream is read out from the buffer and stored into the hard disc at a rate higher than a rate of inputting data to the buffer. In this way, a transport stream received continuously from the multiplexer/demultiplexer 14 can be all written into the hard disc of the HDD 18.

The buffer controller 17 also executes control to store signal received from the HDD 18 intermittently into a buffer so that the stored signal can be supplied to the multiplexer/demultiplexer 14 as a continuous transport stream.

In accordance with a command issued by the system controller 31, the HDD 18 stores a transport stream received from the buffer controller 17 intermittently into the hard disc at a predetermined address. The HDD 18 also seeks a predetermined address, reads out a transport stream from the address and supplies the stream to the buffer controller 17.

The buffer controller 17 and the HDD 18 adopt an IDE (Integrated Drive Electronics) protocol. It should be noted, however, that any protocol can be adopted in the present invention as long as the protocol is used for recording a transport stream.

In accordance with a command issued by the system controller 31, the MPEG AV decoder 19 separates a PES received from the multiplexer/demultiplexer 14 into a video elementary stream and an audio elementary stream. The MPEG AV decoder 19 then carries out a predetermined decoding process on the elementary streams, supplying video data of a base band to the video-signal post-processing circuit 20 and audio data of the base band to an audio-signal post-processing circuit 24.

In accordance with a command issued by the system controller 31, the video-signal post-processing circuit 20 switches the input from a video signal supplied by the video-signal preprocessing circuit 12 to video data of the base band supplied by the MPEG AV decoder 19 or vice versa, and synthesizes the video signal and the video data. The video-signal post-processing circuit 20 also carries out filtering on the input data and supplies the filtered data to an on-screen display circuit 21. In addition, the video-signal post-processing circuit 20 also provides a GUI (Graphic User Interface) for displaying pictures and generates a representative picture of a program represented by picture data. The video-signal post-processing circuit 20 then pastes the representative picture of a program on a window and supplies the window to the on-screen display circuit 21.

In accordance with a command issued by the system controller 31, the on-screen display circuit 21 converts text information into corresponding picture data and superposes the picture data obtained as a result of the conversion on picture data received from the video-signal post-processing circuit 20. The on-screen display circuit 21 then supplies the superposed picture data to an NTSC encoder 22.

In accordance with a command issued by the system controller 31, the NTSC encoder 22 converts picture data (or a component digital signal) received from the on-screen display circuit 21 into Y and C signals. Then, the NTSC encoder 22 generates an S video signal completing a D/A conversion process and an analog composite video signal. The NTSC encoder 22 supplies the S video signal completing a D/A conversion process and the analog composite video signal to an external apparatus through external video output terminals 23-1 and 23-2.

In accordance with a command issued by the system controller 31, the audio-signal post-processing circuit 24 carries out processes such as filtering, fading and conversational-speed conversion on audio data of the base band received from the MPEG AV decoder 19, supplying a result of the processes to a terminal a of a switch 25.

In accordance with a command issued by the system controller 31, the switch 25 sets its contact at a terminal a to supply audio data received from the audio-signal post-processing circuit 24 to a D/A converter 26, or a terminal b to supply audio data received from the A/D converter 6 to the D/A converter 26. The D/A converter 26 converts audio data received from the switch 25 into analog data in D/A conversion and supplies the analog data to an external apparatus by way of an external audio output terminal 27.

The system controller 31 reads out a program from a ROM (Read-Only Memory) 33 through a host bus 32 and executes the program to control other components. A RAM (Random-Access Memory) 34 is used properly for storing a program and data which are required for controlling the other components. The system controller 31, the ROM 33 and the RAM 34 are connected to each other and to an input/output interface 35 by the host bus 32. The input/output interface 35 is connected to a drive 36 for driving a magnetic disc 41, an optical disc 42, a magneto-optical disc 43 or a semiconductor memory 44. The input/output interface 35 is also connected to an input unit 37 including a keyboard, a mouse, buttons, switches and a remote commander.

The hard-disc recorder is capable of inputting and outputting not only an analog signal, but also digital data. For example, an IRD (Integrated Receiver Decoder) not shown in the figure is allowed to supply a transport stream to a digital interface 15 through an IEEE (the Institute of Electrical and Electronic Engineers)-1394 serial bus connected to a digital input/output terminal 16. In accordance with a command issued by the system controller 31, the digital interface 15 carries out an interfacing process to supply the input transport stream to the multiplexer/demultiplexer 14. In accordance with a command issued by the system controller 31, the multiplexer/demultiplexer 14 outputs the transport stream received from the digital interface 15 to the buffer controller 17.

The multiplexer/demultiplexer 14 also outputs a transport stream received from the buffer controller 17 to the digital interface 15. The digital interface 15 supplies the transport stream received from the multiplexer/demultiplexer 14 to the external IRD through a digital input/output terminal 16 and the IEEE-1394 serial bus. The IRD outputs the transport stream on a monitor connected thereto to be displayed on the monitor.

In this embodiment, the hard-disc recorder is connected to the IRD as described above. It should be noted, however, that the scope of the present invention is not limited to this configuration. For example, the hard-disc recorder can also be connected to a personal computer or another apparatus.

In addition, while a video signal is compressed by adoption of the MPEG technique, the scope of the present invention is not limited to this technique. That is to say, other compression techniques can also be adopted.

Furthermore, in place of a hard disc of the HDD 18, it is also possible to use other recording media such as an optical disc, a magneto-optical disc and a solid-state memory.

Next, a method of determining a representative picture of a program is explained.

Normally, a picture appearing right after the start of a recording operation is used as a picture representing a program. As an alternative, a picture appearing after a predetermined lapse of time since the start of a recording operation can also be used as a screen representing a program. The representative picture is referred to hereafter as a title screen.

As a program's representatives used for knowing the contents of the program, it is possible to use video signals taken at fixed intervals. The picture is referred to hereafter as a searched scene.

Since the system controller 31 recognizes the start of a recording operation and a predetermined lapse of time since the start of a recording operation, pictures appearing at the start of a recording operation and after a predetermined lapse of time since the start of a recording operation can be cataloged with ease. The pictures are normally supplied to the video-signal preprocessing circuit 12 which detects the pictures to form a judgment as to whether or not the picture is suitable for use as a representative picture of a program.

First of all, in detection of a commercial, the video-signal preprocessing circuit 12 detects a scene-change portion of a picture and supplies a result of detection to the system controller 31.

The system controller 31 detects a commercial by using the result of detection and audio information received from another system.

As a technique of detecting a commercial, it is possible to adopt an already proposed method such as a method disclosed in Japanese Patent Laid-open No. Hei 9-25494. Of course, another method can also be adopted for detecting a commercial.

In this way, the system controller 31 is capable of recognizing that a picture to be cataloged as a representative picture of a program is a part of a commercial and, hence, making a decision not to catalog the picture as a representative picture of a program.

If a title screen is a commercial, a screen appearing upon completion of the commercial is cataloged as a title screen. As an alternative, a screen appearing after a predetermined lapse of time since completion of the commercial is cataloged as a title screen.

If a searched scene is a commercial, a thinning process is simply processed or a scene appearing upon completion of the commercial is used as a searched scene and, after a predetermined lapse of time, processing is resumed.

The following description explains a method of detecting a picture having too a small amount of information to infer or grasp a program. An example of such information is a picture, most of which shows a blue sky. Such a picture is referred to hereafter as a meaningless picture.

The following description explains one of methods of determining that a picture is a meaningless picture. The description begins with an explanation of a procedure of determining that a picture is a meaningless picture by using a histogram of a color signal with reference to FIGS. 2A to 5B.

The video-signal preprocessing circuit 12 always acquires a histogram of a video signal and supplies a result of acquisition to the system controller 31.

Figure 2A:
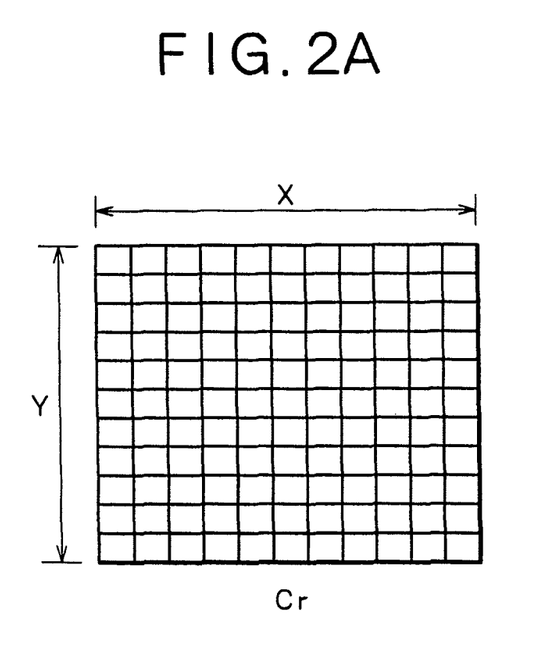
FIGS. 2A and 2B are diagrams showing dimensions of the screen of a picture subjected to a judgment as to whether or not the picture is a meaningless picture.
Figure 2B:
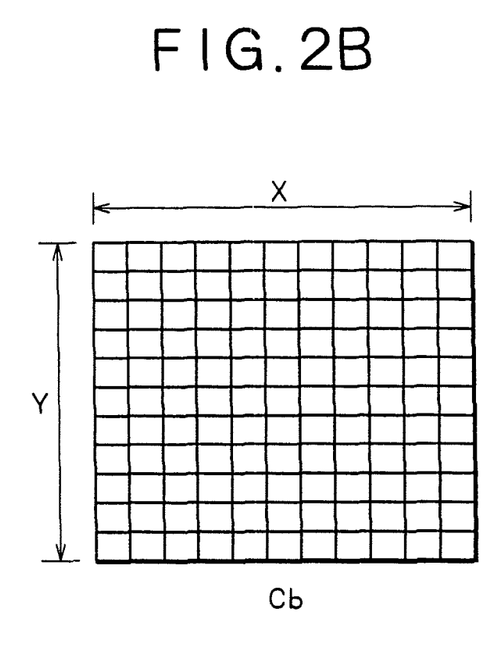

As shown in FIGS. 2A and 2B, the dimensions of a screen is a width of x pixels and a height of y pixels. A histogram is spread horizontally into n grades each representing the color level of a pixel. In the case of a color signal, a Cr histogram and a Cb histogram are provided independently.

In general, a picture with a small amount of information resulted in a histogram tending to be concentrated at particular grades. By utilizing this phenomenon, a degree of histogram distribution exceeding a threshold value determined in advance is regarded to indicate that the picture is a meaningless picture.

Figure 3A:
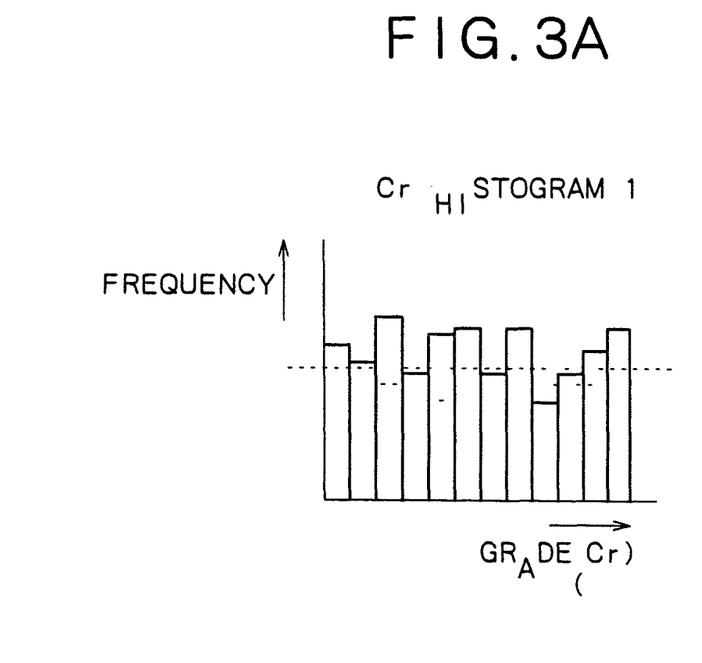
FIGS. 3A and 3B are explanatory diagrams showing a method of detecting a meaningless picture by using a histogram.
Figure 3B:
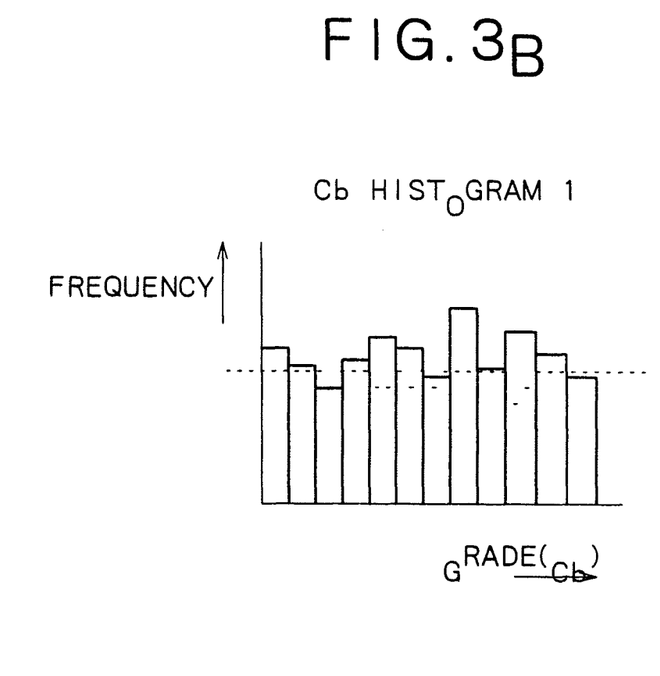

In the case of histogram 1 shown in FIGS. 3A and 3B, for example, the Cr and Cb histograms are each distributed over all grades, indicating that the picture is a meaningful picture.

Figure 4A:
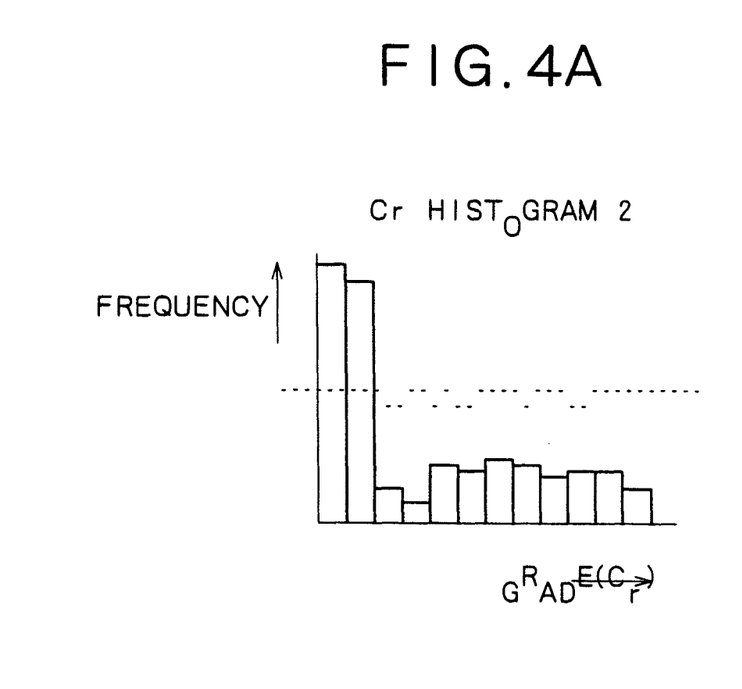
FIGS. 4A and 4B are explanatory diagrams showing a method of detecting a meaningless picture by using a histogram.
Figure 4B:
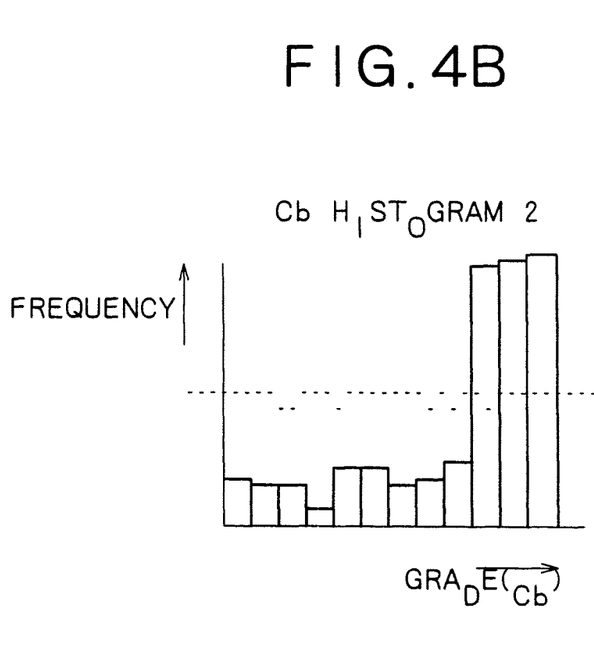

In the case of histogram 2 shown in FIGS. 4A and 4B, on the other hand, the Cr histogram is concentrated at low grades while the Cb histogram is concentrated at high grades, indicating a picture like that of a blue sky. In this case, the picture can be determined to be a meaningless picture not suitable for use as a representative picture of a program.

Figure 5A:
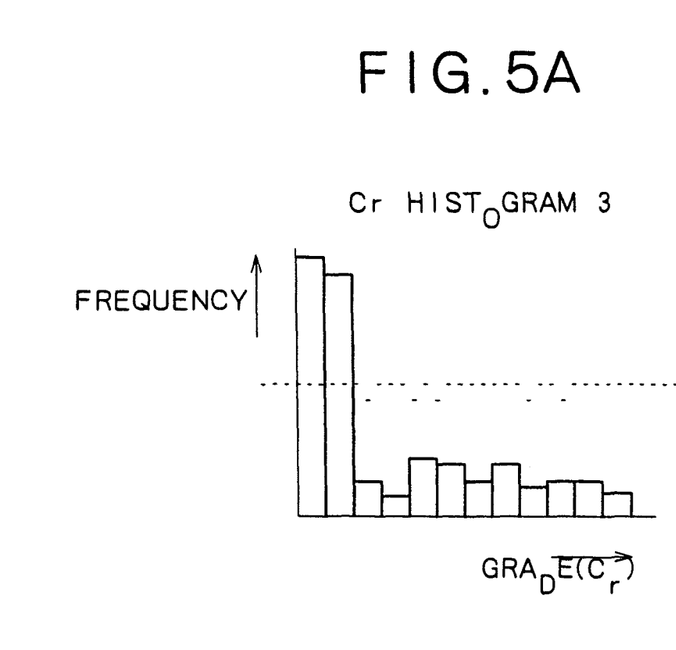
FIGS. 5A and 5B are explanatory diagrams showing a method of detecting a meaningless picture by using a histogram.
Figure 5B:
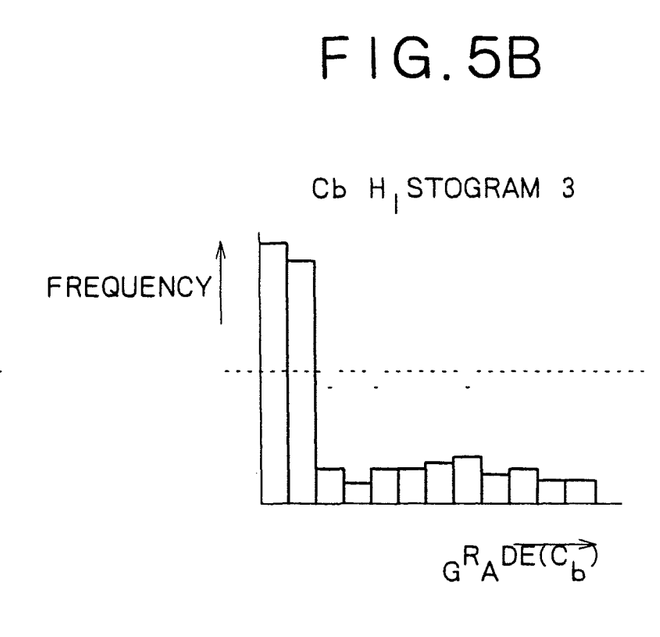

Also in the case of histogram 3 shown in FIGS. 5A and 5B, the Cr and Cb histograms are both concentrated at low grades, indicating that the picture is a meaningless picture as well.

To put it concretely, a threshold value represented by a dashed line is set for each of histograms 1 to 3 shown in FIGS. 3A to 5B respectively. The total area of bar regions above the threshold value is evaluated to form a judgment as to whether or not a picture is a meaningless picture.

In the formation of such a judgment, it is possible to use a variety of quantity combinations such as the sum of total areas for both the Cb and Cr diagrams, the individual total areas and a logical sum of luminance results described earlier.

A characteristic of a meaningless picture is unclear picture edges as observed in a blurring picture. Determination of a meaningless picture by detection of such a characteristic is explained by referring to FIG. 6.

Figure 6:
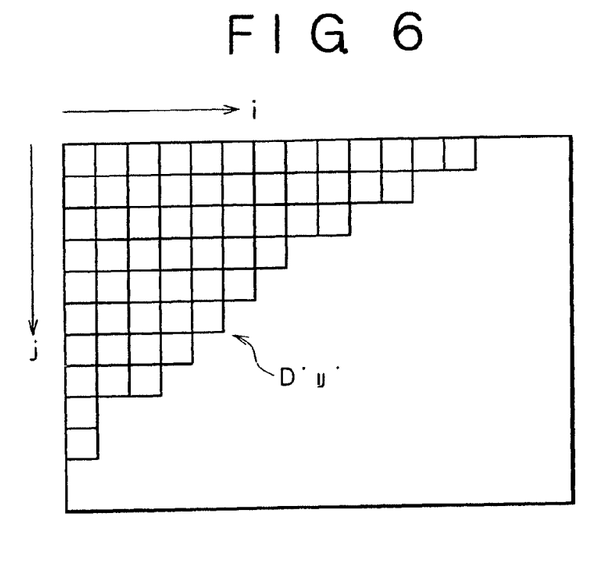
FIG. 6 is an explanatory diagram showing a method of detecting a meaningless picture by using edges of the picture.

In FIG. 6, notation Dij denotes a luminance level of a pixel located at coordinates (i, j) on a field picture. By applying luminance level Dij to Eq. (1) given below, a horizontal-direction edge amount EH can be computed. By the same token, by applying luminance level Dij to Eq. (2) given below, a vertical-direction edge amount EV can be computed.

$$EH = \sum_{i=0}^{n} \sum_{j=0}^{m} \text{abs}(Dij - Dij + 1) \quad (1)$$

$$EV = \sum_{i=0}^{n} \sum_{j=0}^{m} \text{abs}(Dij - Di(j+1)) \quad (2)$$

If the horizontal-direction edge amount EH and the vertical-direction edge amount EV are both smaller than a predetermined threshold value, the picture is determined to be a meaningless picture.

As such, a meaningless picture is determined by adopting the techniques described above. It should be noted, however, that another technique can also be adopted.

If a meaningless picture becomes a candidate for the representative picture of a program, the system controller 31 carries out a thinning process as is the case with a commercial and a process to use a following picture as a representative picture of a program and not to use the meaningless picture as a representative picture of a program.

A program's representative picture detected as described above is recorded. When a representative picture of a program is determined by using a video signal, an audio signal and another signal, information represented by the signals is recorded on a recording medium. A method of recording such information is explained as follows.

Information on a representative picture of a program is recorded in the form of time codes or as the picture itself or as a shrunk picture in a recording medium separately from a video signal. In this case, the representative picture of a program can be recorded in a recording medium different from a recording medium for recording the video signal. As an alternative, the representative picture of a program and the video signal can also be recorded in different areas of the same recording medium.

A typical method for playing back a representative picture of a program recorded as described above is explained as follows.

Figure 7:
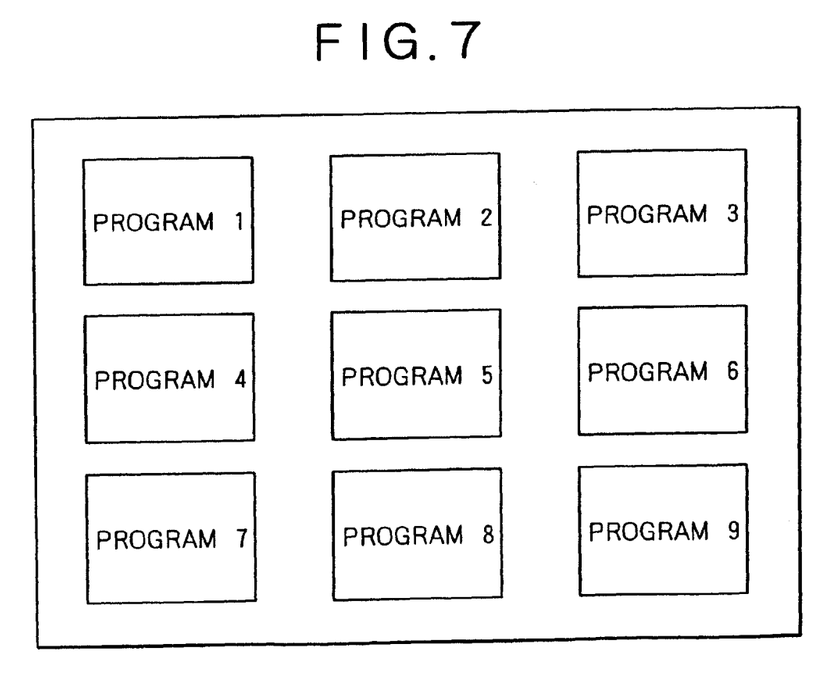
FIG. 7 is a diagram showing a typical GUI (Graphical User Interface) display of a set of title screens.

The explanation begins with a description of a method for displaying a representative picture of a program for each program pertaining to a group of programs recorded on a recording medium. A title screen, which is detected as a representative picture of a program and shows as many titles as programs, is displayed as shown in FIG. 7. By looking at this screen, the user is capable of grasping what programs are recorded.

Figure 8:
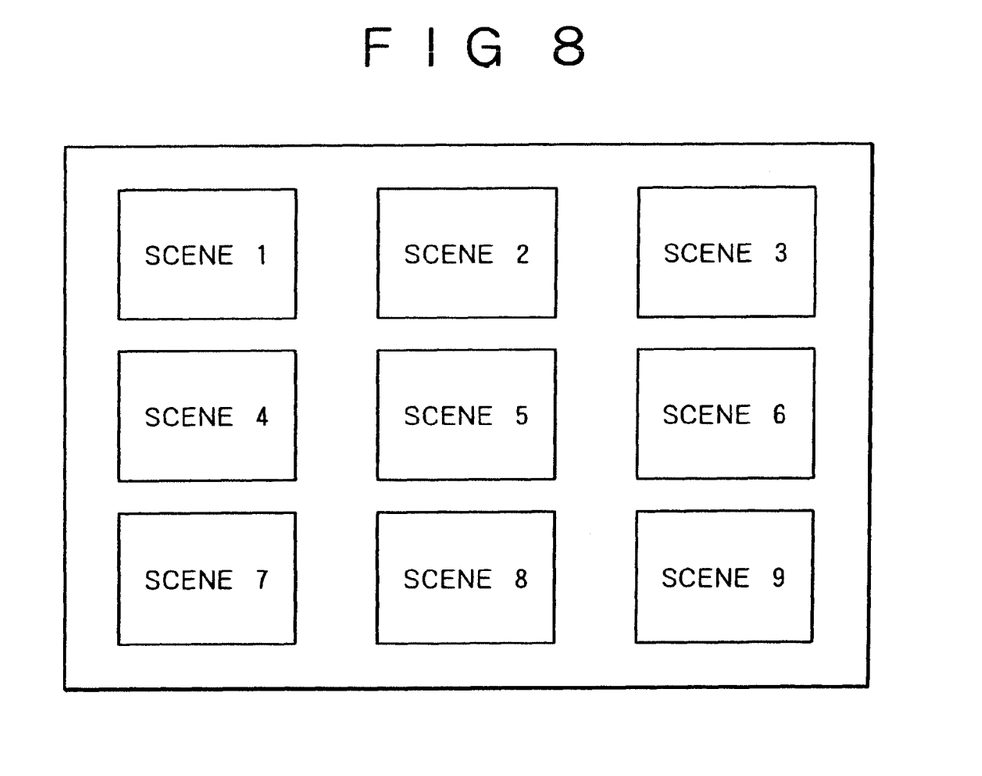
FIG. 8 is a diagram showing a typical GUI display of a set of searched scenes pertaining to a selected program.

In addition, by displaying a plurality of searched scenes pertaining to a selected program as shown in FIG. 8, the user is allowed to look at the scenes and grasp the contents of the program in a short period of time.

As described above, in accordance with the present invention, a meaningless picture is detected and not used as a representative picture of a program to give the following effects.

In accordance with an embodiment of the present invention, the location of a representative picture of a program to be recorded in a recording operation and/or the representative picture of a program itself are stored in the recording operation. In this way, the user is capable of looking at a table of representative pictures of a program pertaining to a group of recorded programs in a playback operation. Such representative pictures of a program are useful to the user in grasping the group of programs recorded in a recording medium instantly.

In addition, the user is also capable of looking at a set of representative scenes pertaining to a specific program. Such a set of representative scenes is convenient, making it easy to search the specific program for a scene of interest.

The larger the recording capacity of a recording medium, the more the programs that can be recorded on the recording medium. With a large number of programs recorded in the recording medium, it is generally considered to be difficult to select a desired specific program. The present invention is specially effective for such a case.

By the way, the series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording memory employed in typically a general-purpose personal computer capable of executing the programs to carry out the pieces of processing.

As shown in FIG. 1, recording media for presenting a program to the user is distributed separately from the computer. In order to present a program to the user, however, the use of package media is not mandatory. Examples of the recording media are the magnetic disc 41 including a floppy disc, the optical disc 42 including a CD-ROM (Compact-Disc Read-Only Memory) and a DVD (Digital Versatile Disc), the magneto-optical disc 43 including an MD (Mini Disc) and the semiconductor memory 44. As an alternative, a program can also be presented to the user by incorporating the program in the computer in advance. That is to say, the program is stored in a ROM or a hard disc included in the HDD.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or independently.

In addition, the technical term 'system' used in this specification means the whole equipment comprising a plurality of apparatuses.

While a preferred embodiment of the present invention has been described using specific terms, such description is for illustrative purposes only, and it is to be understood that changes and variations may be made without departing from the spirit or scope of the following claims.

What is claimed is:

1. A video-signal processing apparatus for setting a representative picture for a sequence of video signals, comprising:
   extracting means for extracting a static picture from the sequence of video signals, the extracting being performed with a predetermined timing, the predetermined timing being a time since a start of a program such that the static picture is extracted at a point which is a predetermined duration into the sequence of video signals;
   judgment means for forming a judgment as to whether or not the static picture extracted by the extracting means is part of a commercial; and
   setting means for discarding the static picture and setting a different static picture as the representative picture in response to the judgment means determining that the static picture extracted by the extracting means is part of a commercial, wherein the different static picture set as the representative picture is a picture appearing upon completion of the commercial,
   wherein the representative picture is a picture that provides a representation of the content contained in the sequence of video signals.

2. The video-signal processing apparatus according to claim 1, wherein the different static picture, set as the representative picture, is a picture appearing a predetermined time period after completion of the commercial.

3. The video-signal processing apparatus according to claim 1, further comprising:
   displaying means for displaying the representative picture in a selectable menu.

4. A video-signal processing apparatus for setting a representative picture for a sequence of video signals, comprising:
   extracting means for extracting a static picture from the sequence of video signals, the extracting being performed with a predetermined timing, the predetermined timing being a time since a start of a program such that the static picture is extracted at a point which is a predetermined duration into the sequence of video signals;
   judgment means for forming a judgment as to whether or not the static picture extracted by the extracting means is a meaningless picture; and
   setting means for discarding the static picture and setting a different static picture as the representative picture in response to the judgment means determining that the static picture extracted by the extracting means is a meaningless picture, wherein the different static picture set as the representative picture is a picture following the meaningless picture,
   wherein the judgment means forms the judgment as to whether or not a static picture extracted by the extracting means is a meaningless picture on the basis of an edge of the static picture, wherein when a horizontal-direction edge amount EH and a vertical-direction edge amount EV are both smaller than a predetermined threshold value, the static picture extracted by the extracting means is determined to be a meaningless picture, and
   wherein the representative picture is a picture that provides a representation of the content contained in the sequence of video signals.

5. The video-signal processing apparatus according to claim 4, wherein the judgment means is capable of forming a judgment as to whether or not a static picture extracted by the extracting means is a meaningless picture on the basis of whether a histogram distribution of the static picture exceeds a predetermined threshold.

6. A video-signal processing method adopted in a video-signal processing apparatus for setting a representative picture for a sequence of video signals, said video-signal processing method comprising:
   an extracting step of extracting a static picture from the sequence of video signals, the extracting being performed with a predetermined timing, the predetermined timing being a time since a start of a program such that the static picture is extracted at a point which is a predetermined duration into the sequence of video signals;
   a judgment step of forming a judgment as to whether or not the static picture extracted at the extracting step is a part of a commercial; and a setting step of discarding the static picture and setting a different static picture as the representative picture in response to the judgment step determining that the static picture extracted by the extracting means is part of a commercial, wherein the different static picture set as the representative picture is a picture appearing upon completion of the commercial, wherein the representative picture is a picture that provides a representation of the content contained in the sequence of video signals.

7. A non-transitory computer readable medium storing computer program instructions for controlling a video-signal processing apparatus for setting a representative picture for a sequence of video signals, which when executed by a computer programmed with the instructions, causes the computer to perform the following steps:

an extracting step of extracting a static picture from the sequence of video signals, the extracting being performed with a predetermined timing, the predetermined timing being a time since a start of a program such that the static picture is extracted at a point which is a predetermined duration into the sequence of video signals;

a judgment step of forming a judgment as to whether or not the static picture extracted at the extracting step is a part of a commercial; and a setting step of discarding the static picture and setting a different static picture as the representative picture in response to the judgment step determining that the static picture extracted by the extracting means is part of a commercial, wherein the different static picture set as the representative picture is a picture appearing upon completion of the commercial, wherein the representative picture is a picture that provides a representation of the content contained in the sequence of video signals.

8. A video-signal processing apparatus for setting a representative picture for a sequence of video signals, comprising:

an extracting mechanism configured to extract a static picture from the sequence of video signals, the extracting being performed with a predetermined timing, the predetermined timing being a time since a start of a program such that the static picture is extracted at a point which is a predetermined duration into the sequence of video signals;

a judgment mechanism configured to form a judgment as to whether or not the static picture extracted by the extracting mechanism is part of a commercial; and a setting mechanism configured to discard the static picture and set a different a static picture as the representative picture in response to the judgment mechanism determining that the static picture extracted by the extracting mechanism is part of a commercial, wherein the different static picture set as the representative picture is a picture appearing upon completion of the commercial, wherein the representative picture is a picture that provides a representation of the content contained in the sequence of video signals.

9. A video-signal processing apparatus for setting a representative picture for a sequence of video signals, comprising:

an extracting mechanism configured to extract a static picture from the sequence of video signals, the extracting being performed with a predetermined timing, the predetermined timing being a time since a start of a program such that the static picture is extracted at a point which is a predetermined duration into the sequence of video signals;

a judgment mechanism configured to form a judgment as to whether or not the static picture extracted by the extracting mechanism is meaningless picture; and a setting mechanism configured to discard the static picture and set a different static picture as the representative picture in response to the judgment mechanism determining that the static picture extracted by the extracting means is a meaningless picture, wherein the different static picture set as the representative picture is a picture following the meaningless picture, wherein the judgment mechanism is configured to form the judgment as to whether or not a static picture extracted by the extracting mechanism is a meaningless picture on the basis of an edge of the static picture, wherein when a horizontal-direction edge amount EH and a vertical-direction edge amount EV are both smaller than a predetermined threshold value, the static picture extracted by the extracting means is determined to be a meaningless picture, and wherein the representative picture is a picture that provides a representation of the content contained in the sequence of video signals.

10. The video-signal processing apparatus according to claim 9, wherein the judgment mechanism is capable of forming a judgment as to whether or not the static picture extracted by the extracting mechanism is a meaningless picture on the basis of an edge of whether a histogram distribution of the static picture exceeds a predetermined threshold.

11. A video-signal processing method adopted in a video-signal processing apparatus for setting a representative picture for a sequence of video signals, said video-signal processing method comprising:

an extracting step of extracting a static picture from the sequence of video signals, the extracting being performed with a predetermined timing, the predetermined timing being a time since a start of a program such that the static picture is extracted at a point which is a predetermined duration into the sequence of video signals;

a judgment step of forming a judgment as to whether or not the static picture extracted at the extracting step is a meaningless picture; and a setting step of discarding the static picture and setting a different static picture as the representative picture in response to the judgment step determining that the static picture extracted by the extracting means is a meaningless picture, wherein the different static picture set as the representative picture is a picture following the meaningless picture, wherein the judging step further forms the judgment as to whether or not a static picture extracted by the extracting is a meaningless picture on the basis of an edge of the static picture, wherein when a horizontal-direction edge amount EH and a vertical-direction edge amount EV are both smaller than a predetermined threshold value, the static picture extracted by the extracting means is determined to be a meaningless picture, and wherein the representative picture is a picture that provides a representation of the content contained in the sequence of video signals.

12. The video-signal processing method according to claim 11, wherein a judgment as to whether or not the static picture extracted at the extracting step is a meaningless picture is made on the basis of whether a histogram distribution of the static picture exceeds a predetermined threshold.

13. A non-transitory computer readable medium storing computer program instructions for controlling a video-signal processing apparatus for setting a representative picture for a sequence of video signals, which when executed by a computer programmed with the instructions, causes the computer to perform the following steps:

an extracting step of extracting a static picture from the sequence of video signals, the extracting being performed with a predetermined timing, the predetermined timing being a time since a start of a program such that the static picture is extracted at a point which is a predetermined duration into the sequence of video signals;

a judgment step of forming a judgment as to whether or not the static picture extracted at the extracting step is a meaningless picture; and a setting step of discarding the static picture and setting a different static picture as the representative picture in response to the judgment step determining that the static picture extracted by the extracting means is a meaningless picture, wherein the different static picture set as the representative picture is a picture following the meaningless picture, wherein the judging step further forms the judgment as to whether or not a static picture extracted by the extracting is a meaningless picture on the basis of an edge of the static picture, wherein when a horizontal-direction edge amount EH and a vertical-direction edge amount EV are both smaller than a predetermined threshold value, the static picture extracted by the extracting means is determined to be a meaningless picture, and wherein the representative picture is a picture that provides a representation of the content contained in the sequence of video signals.

14. The non-transitory computer readable medium storing computer program instructions according to claim 13, wherein a judgment as to whether or not the static picture extracted at the extracting step is a meaningless picture is made on the basis of whether a histogram distribution of the static picture exceeds a predetermined threshold.

* * * * *